United States Patent Office 3,827,995
Patented Aug. 6, 1974

3,827,995
COPOLYMER BLENDS AND METHOD
OF MAKING SAME
James T. White, Cottondale, and Donald L. Gumprecht, Tuscaloosa, Ala., assignors to Reichhold Chemicals, Inc., White Plains, N.Y.
No Drawing. Continuation of application Ser. No. 282,939, Aug. 23, 1972, which is a continuation of application Ser. No. 107,583, Jan. 18, 1971, both now abandoned. This application Apr. 25, 1973, Ser. No. 354,383
Int. Cl. C08g 51/24
U.S. Cl. 260—29.4 R
2 Claims

ABSTRACT OF THE DISCLOSURE

Stable, homogeneous thermosetting, liquid resin compositions useful for treating the surface of felted mineral fiber-board panels which are bonded with a hydrophilic binder to reduce sag and to the method of making the same. Compositions of this invention comprise a copolymer blend of (1) from about 25% to about 55% by weight, of a melamine-formaldehyde copolymer and (2) from about 75% to about 45% by weight of a urea-formaldehyde copolymer. These compositions may be stabilized through the addition of from about 0.05% to about 0.5% by weight of an ammonium hydroxide-sodium hydroxide stabilizer solution. Resin compositions of this invention may be reduced with water and/or compounded with fillers and other materials or they may be used alone.

---

This is a continuation of application Ser. No. 282,939, filed Aug. 23, 1972 which is a continuation of application Ser. No. 107,583, filed Jan. 18, 1971, both now abandoned.

The invention relates to copolymer blends and more particularly to stable, homogeneous thermosetting, liquid resin compositions useful for treating the surface of felted mineral fiberboard panels which are bonded with a hydrophilic binder to reduce sag and method of making the same. Compositions of this invention comprise a copolymer blend of (1) from about 25% to about 55% by weight of a melamine-formaldehyde copolymer and (2) from about 75% to about 45% by weight of a urea-formaldehyde copolymer. These compositions may be stabilized through the addition of from about 0.05% to about 0.5% by weight of an ammonium hydroxide-sodium hydroxide stabilizer solution. Resin compositions of this invention may be reduced with water and/or compounded with fillers and other materials or they may be used alone.

Felted mineral fiberboards have found acceptance in a wide range of applications. They are used as wall panels both for decoration and their acoustical properties and as ceiling tiles or panels. Panels are generally available in large sizes such as 2 x 4 feet whereas the ceiling tiles range upwards in size from about 12 x 12 inches. They may range in thickness from about ⅜ inch to about 1 inch.

Regardless of the size or end use, these panels are made from individual fibers which are bonded together by a hard, dried, hydrophilic binder. The fibers used to make these mineral fiberboards may be felted synthetic mineral fibers or felted cellulosic fibers or admixtures of both. In general, the major portion of the fibers in these admixtures are mineral fibers and the boards are referred to as "mineral fiberboards." The hard, dried hydrophilic binder used to bond the fibers together is generally some form of starch. This starch is incorporated into the panel during processing. One method for preparing mineral fiberboards is to blend gelatinized or pasted starch into an aqueous slurry of fibers which is then dewatered and felted into a wet mat before being dried into a rigid board. Another method is to blend starch grains into the aqueous slurry of fibers and to then heat the wet mat to a temperature high enough to gelatinize the starch before drying the mat to produce a rigid board. It is also known to combine gelatinized starch and starch grains in the aqueous slurry of fibers and to then process the wet as if it contained only starch grains.

The terms "panel" and "mineral fiber board panel" and "fiberboard panel" when used throughout this description are intended to encompass felted mineral fiberboard panels and binders as described heretofor.

Fiberboard panels when used for ceilings are mounted horizontally and generally only supported at opposite edges. In the presence of a warm humid atmosphere such panels have a tendency to sag. This tendency is increased as both temperature and humidity increase and seems greatest when the humidity exceeds about 90% relative humidity. Since the mineral fibers used in fiberboard panels are impenetrable by the starch binder it is present only as a thin coating over and between individual fibers. The hydrophilic nature of the starch binder permits it to absorb water vapor which softens these thin coatings allowing sagging of the panel to occur.

It is known to coat the surface of fiberboard panels with moisture resistant resins or resin compositions to reduce the tendency of panels to sag. These resins are generally low molecular weight straight melamine formaldehyde copolymers which are water insoluble and must be suspended in water with clay, thereby requiring extra process operations and cost or a low solids content aqueous solution of a modified urea-formaldehyde copolymer which must be applied in more than one application in order to deposit sufficient resin to be effective or a phenol-formaldehyde resin again used as a power. Other resin compositions are available which are dissolved in an inflammable solvent resulting in potential fire hazards and possibly toxic vapors.

It is therefore an object of this invention to treat felted mineral fiberboard panels to minimize their tendency to sag.

It is another object of this invention to treat felted mineral fiberboard panels to minimize their tendency to sag through the use of novel, stable, homogeneous, thermosetting liquid resin compositions.

Surprisingly, it has now been found that these and other objects can simply be achieved by treating the mineral fiberboard panel on at least one surface with a thermosetting liquid resin composition as hereafter described. These resin compositions comprise a liquid thermosetting blend of liquid thermosetting copolymers comprising (1) from about 25% to about 55% by weight, based upon the total weight of the copolymer blend, of a melamine-formaldehyde copolymer having a mol ratio of melamine to formaldehyde of about 1.0:2.5 and (2) from about 75% to about 45% by weight based upon the total weight of the copolymer blend, of a urea-formaldehyde copolymer, having a mole ratio of urea to formaldehyde of about 1.0:1.9. Stabilization may be achieved through the use of from about 0.05% to about 0.5% by weight, based upon the total weight of the thermosetting copolymer blend (1) and (2) of an ammonium hydroxide-sodium hydroxide stabilizer solution. This stabilizer has a ratio of concentrated liquid ammonium hydroxide to a 50% by weight aqueous sodium hydroxide solution of about 2.0:1.0 by weight. These resin compositions may be used neat or reduced with water to make any easily handled, non-inflammable aqueous-solution. The finished resin compositions are then brought to a pH from about 8.6 to about 8.8 with aqueous base.

Fiberboards which are treated with the resin compositions of this invention have the fibers on the surface and those near the surface resin coated. This resin coating, when thermoset, is unaffected by variations in temperature and relative humidity thereby preventing the panel from sagging due to moisture absorption and softening of the hydrophilic fiber binder.

The melamine-formaldehyde copolymer is prepared by reacting, under conditions well known in the art, about 1.0 mole of melamine and about 2.5 moles of formaldehyde at a pH ranging from about 8.6 to about 9.6, heating to about 90° C. and holding the temperature until the resulting water dilutability is about 170–190% measured at 25° C. The mole ratio of melamine to formaldehyde may vary from about 1:1 to about 1:6 or greater but superior results are obtained when the mole ratio is about 1.0:2.5. The pH is adjusted with a base which preferably includes a strong base such as sodium hydroxide, potassium hydroxide, and the like.

Copolymers of urea and formaldehyde suitable for the practice of this invention are prepared by reacting about 1.0 mole of urea and about 1.9 moles of formaldehyde, by first adjusting the pH to about 6.9 to about 7.1 with acid, heating to about 90° C. and holding until a 50° C. cloud point is reached. Afterwards, the pH is adjusted to about 5.6–5.8 with acid and further reacted until a Gardner-Holdt viscosity of "U" is obtained. Final pH is adjusted to about 7.5–7.7 with an organic amine. The mole ratio of urea to formaldehyde may range from about 1:1 to 1:4 but the preferred ratio is about 1.0:1.9. The acid used to adjust the pH may be formic acid and the like whereas the amine is preferably an alkyl or alkylol amine such as triethylamine, triethanolamine and the like and mixtures thereof.

These two copolymers are blended together in a percentage of melamine formaldehyde copolymer to urea-formaldehyde copolymer ranging from about 25% to 55% to about 75% to 45% by weight based upon the total weight of the two copolymers. However, the optimum percentage is about 35% melamine formaldehyde copolymer to about 65% urea-formaldehyde copolymer by weight based upon the total weight of the copolymer blend because of the superior results obtained therefrom. These resin blends have good inherent stability but it is generally preferred to add additional stabilizer in order to gain maximum storage life. However, the stabilizer does not affect the ability of these resin compositions to minimize sagging.

This copolymer blend may be stabilized and stored as blended or, preferably, water is added until the non-volatile content of the copolymer blend is about 60% non-volatile. By adjusting the non-volatile content as described above a great advantage is realized by the manufacture of fiberboard panels in that (1) the use of extenders is not required to adjust the viscosity since the produced viscosity is such that it may be used in its original state. (2) It is not too sticky or viscous thereby making handling easy, (3) there is no danger from storing flammable materials since the resin composition is in an aqueous medium and (4) when the resin composition is thermoset there are no solvents given off which might be both toxic and environment polluting.

In any event, whether the copolymer blend is stored neat or reduced with water, it may be stabilized through the addition of an organic amine such as triethylamine, triethanolamine and the like or preferably with an ammonium hydroxide-sodium hydroxide solution. It has been found that this stabilizer composition possesses excellent storage stability when the pH is adjusted to about 8.6 to 8.8. Total stabilizer content using the ammonium hydroxide-sodium hydroxide system ranges from about 0.05% to about 0.5% based upon the weight of the copolymer blend. However, the preferred amount is about 0.35% based upon the weight of the copolymer blend. The sodium hydroxide is added to the ammonium hydroxide at a ratio of about 1 part by weight of an aqueous sodium hydroxide solution which is a 50% solution by weight and about 2 parts by weight commercial liquid concentrated ammonium hydroxide. This stabilizer system is the preferred stabilizer for the practice of this invention. Because of its particular combination of melamine-formaldehyde to urea-formaldehyde copolymers, and stabilizer system these compositions do not have to be spray dried or dissolved in organic solvents in order to maintain them in a stable condition for long periods of time.

Table I shows storage stability tests between an unstabilized melamine-formaldehyde copolymer-urea-formaldehyde copolymer blend and a resin composition of instant invention. It can easily be seen that those new resin compositions have superior storage life.

TABLE I.—STORAGE STABILITY TEST

|  | Stability [1] (days) | |
| --- | --- | --- |
|  | 25° C. | 43° C. |
| Unstabilized resin | 47 | 6 |
| Stabilized resin [2] | 140 | 20 |

[1] Stability means the number of days required before a sample of resin gells at the specified temperature.
[2] This sample is a 35% melamine formaldehyde-65% urea formaldehyde copolymer blend at 60% non-volatile stabilized with 0.35% by weight ammonium hydroxide stabilizer added. The unstabilized resin sample is identical but with no stabilizer added.

A preferred formulation of instant invention is 35% melamine-formaldehyde to 65% urea-formaldehyde copolymer blend stabilized with 0.35% ammonium hydroxide-sodium hydroxide solution and reduced to a non-volatile content of about 60% and has the following physical constant specifications:

| | |
| --- | --- |
| Percent Non-Volatile | 59–61. |
| Specific Gravity at 25° C. | 1.240–1.260. |
| Free Formaldehyde | 1.5% maximum. |
| pH at 25° C. | 8.6–8.8. |
| Appearance | Opaque, homogeneous. |
| Color | Clear to white. |
| Viscosity at 25° C. | G–K. |
| Water Dilutability at 25° C. | 500% maximum. |

Resin compositions of this invention may be used neat, diluted as indicated above, and/or further compounded with fillers, preferably inorganic fillers such as hard clay, soft clay, calcined clay, talc, calcium carbonate, magnesium silicate, and carbon black and the like and mixtures there. Further, these new compositions are easily adaptable to a majority of coating formulations used in the fiberboard panel industry such as those requiring highly pigmented paints involving fillers, titanium dioxide, acrylic or polyvinyl acetate resins and the like.

The resin composition with or without fillers, etc., may be applied to either a wet pressed felt of mineral fibers or to a finished dry board. It may be applied to either one or both sides of the board by roll coating, spraying, curtain coating or any similar type surface application. The coating need not be continuous as various methods may be used to manufacture fiberboard panels produce boards which have high and low areas. Satisfactory results may be obtained with these new resin compositions when they are applied by roll coating for example to only the high areas as in the case of acoustical tile boards.

Approximately 6 to 15 pounds of resin solids per 1000 square feet of fiberboard may be applied but about 8 to 12 pounds is preferred. After the resin composition has been applied it may be thermoset by heating the fiberboard at a temperature ranging from about 300° to 600° F.; however, a temperature of 400° to 500° F. is preferred.

The ability of these resin compositions to minimize the tendency of fiberboard panels to sag is superior to that of resins now available. Table II shows a typical sag test comparison between an untreated panel and one treated with a preferred formulation of this invention.

This sag test is an industry standard and is conducted on a 2' x 4' panel known as a "drop in panel." The sag is measured horizontally from a standard 180° plane when exposed to 90° F. and 90% relative humidity. Panels are suspended horizontally and supported only at opposite edges.

TABLE II

| Days at 90° F., 90% relative humidity | Untreated panel (in.) | Panel treated with new resin composition*(in.) |
|---|---|---|
| 3 | 0.250 | 0.050 |
| 7 | 0.510 | 0.120 |

*Prepared as follows: 35% melamine-formaldehyde copolymer blended with 65% urea-formaldehyde copolymer and then reduced to 60% N.V. with water and stabilized with 0.35% by weight, based upon the weight of the copolymers solids, of ammonium hydroxide-sodium hydroxide solution.

As can easily be seen, there is a great improvement in sag resistance both after 3 days, which is on the order of 80%, and after 7 days exposure where over a 76.5% improvement is realized.

The following examples are intended to better illustrate the scope of this invention but are not meant to limit it in its broadest scope.

EXAMPLE I

Preparation of a Melamine-Formaldehyde Copolymer

Into a resin flask equipped with heating mantle, stirrer, condenser, vacuum, thermometer, and inert gas sparge was added 202.8 grams of a 37% formaldehyde solution (25 moles) and 1267 grams (10 moles) of melamine with stirring under an $N_2$ blanket. The temperature was raised to about 90° C. and the pH was adjusted to 8.8 with a 50% solution of sodium hydroxide. Conditions were maintained and samples removed until the water dilutability was about 180% measured at 25° C. Water was then stripped off and the resin was ready for use.

EXAMPLE II

Preparation of a Urea-Formaldehyde Copolymer

Into a resin flask set up as described in Example I was added 1141 grams (19 moles) of a 50% formaldehyde solution and 601 grams (10 moles) urea with stirring under an $N_2$ blanket. The pH was adjusted to about 7.0 with phosphoric acid and trisodium phosphate and heated to about 90° C. Conditions were maintained until a 50° C. cloud point was reached. The pH was then reduced to about 5.6 with formic acid and heating continued until a Gardner-Holdt viscosity of "U" was obtained measured at 25° C. Final pH was adjusted to 7.7 with triethylamine and the resin reduced with water to a non-volatile of 65%.

EXAMPLE III

Preparation of an Ammonium Hydroxide-Sodium Hydroxide Stabilizer Solution

Into a beaker equipped with a means for mixing was added 66 grams of concentrated liquid ammonium hydroxide and 33 grams of a 50% aqueous solution by weight sodium hydroxide. Mixing was continued until the solution was clear.

EXAMPLE IV

Preparation of a Typical Resin Composition

Into a suitable flask was added 462.8 grams of the urea-formaldehyde copolymer as prepared according to Example II. To this was added with stirring 269.2 grams of the melamine-formaldehyde copolymer as prepared according to Example I and then 2.7 grams of the stabilizer solution as prepared according to Example III. The resulting resin composition had the pH adjusted to 8.8 by adding dropwise a 50% aqueous solution, by weight, of sodium hydroxide.

EXAMPLE V

Example IV was repeated except that the finished resin composition was reduced with water until the non-volatile content was about 60% non-volatile.

The invention has been described in detail for the purpose of illustration, but it will be obvious that numerous modifications and variations may be made without departing from the spirit of the invention, as set forth in the claims, as will be apparent to those skilled in the art.

What is claimed is:

1. A process of making a thermosetting liquid composition which comprises forming a liquid thermosetting blend of liquid thermosetting copolymers comprising (1) from about 25% to about 55% by weight, based upon the total weight of (1) and (2), of a melamine-formaldehyde copolymer, said copolymer having a mole ratio of melamine to formaldehyde of about 1.0:2.5 and (2) from about 75% to about 45% by weight, based upon the total weight of (1) and (2), of a urea-formaldehyde copolymer, said copolymer having a mole ratio of urea to formaldehyde of about 1.0:1.9 and (3) from about 0.05% to about 0.5% by weight based upon the total weight of the thermosetting copolymer blend of an ammonium hydroxide-sodium hydroxide stabilizer, said stabilizer having a ratio of concentrated liquid ammonium hydroxide to a 50%, by weight, aqueous solution of sodium hydroxide of about 2.0:1.0, by weight, said process including the steps of intimately blending components (1) and (2) at about room temperature by mixing until a homogeneous blend is attained, and then adding component (3), the stabilizer, to the blend with mixing and then adding, with mixing, an aqueous base until the pH ranges from about 8.6 to about 8.8.

2. A stable liquid thermosetting resin blend of liquid thermosetting copolymers produced according to Claim 1, consisting essentially of (1) from about 25% to about 55% by weight, based upon the total weight of (1) and (2) of a melamine-formaldehyde copolymer, said copolymer having a mole ratio of melamine to formaldehyde of about 1.0:2.5 and (2) from about 75% to about 45% by weight, based upon the total weight of (1) and (2), of a urea-formaldehyde copolymer, said copolymer having a mole ratio of urea to formaldehyde of about 1.0:1.9 and (3) from about 0.05% to about 0.5%, by weight, based upon the total weight of the thermosetting copolymer blend of an ammonium hydroxide-sodium hydroxide stabilizer, said stabilizer having a ratio of concentrated liquid ammonium hydroxide to a 50%, by weight, aqueous solution of sodium hydroxide of about 2.0:1.0, by weight, and sufficient aqueous base such that the pH ranges from about 8.6 to about 8.8.

References Cited

UNITED STATES PATENTS 2,675,338   4/1954   Phillips _____ 260—29.4 R
3,067,160  12/1962   Van Loo _____ 260—29.4 R LORENZO B. HAYES, Primary Examiner U.S. Cl. X.R.

260—849; 117—140 A